United States Patent [19]
Kisaka et al.

[11] Patent Number: 5,637,970
[45] Date of Patent: Jun. 10, 1997

[54] MOTOR SPEED CONTROL APPARATUS AND MOTOR SPEED CONTROL METHOD

[75] Inventors: Masashi Kisaka, Yokohama; Hiroshi Uchiike, Sagamihara, both of Japan

[73] Assignee: International Business Machines Corporation, Armonk, N.Y.

[21] Appl. No.: 532,084

[22] Filed: Sep. 22, 1995

[51] Int. Cl.$^6$ ................................................ G11B 19/28
[52] U.S. Cl. ..................... 318/561; 318/603; 388/815; 364/148
[58] Field of Search ............................. 318/560, 561, 318/568.22, 603; 364/148–151; 388/809–815; 369/266, 267; 360/73.01, 73.03

[56] References Cited

U.S. PATENT DOCUMENTS

| | | | |
|---|---|---|---|
| 4,653,040 | 3/1987 | Senso | 369/239 |
| 4,860,231 | 8/1989 | Ballard et al. | 364/571.01 |
| 5,054,014 | 10/1991 | Ito et al. | 369/190 |
| 5,241,651 | 8/1993 | Ueda | 395/61 |
| 5,304,905 | 4/1994 | Iwasaki | 318/561 |
| 5,508,987 | 4/1996 | Matsunaga et al. | 369/58 |

Primary Examiner—Brian Sircus
Attorney, Agent, or Firm—Merchant, Gould, Smith, Edell, Welter & Schmidt, P.A.

[57] ABSTRACT

A method and apparatus for controlling the speed of a motor for a hard disk drive. The motor speed control apparatus includes a speed feedback controller which uses selected feedback coefficients. The feedback coefficients are suitable to the rotor assemblies having different moments of inertia. A driving force is applied to the motor to rotate the installed rotary assembly. A detector determines the period of rotation and a period of subsequent rotation at the initiation of the motor. An identification means identifies a rotor assembly installed on the motor from said detected period. The time constant of said motor is a function of the moment of inertia of the rotor assembly installed on the motor and can be obtained from the period of rotation and the period of subsequent rotation at the time said motor is started up. A selector chooses the appropriate feedback coefficients for the identified rotor assembly. The rotor assembly varies its moment of inertia according to the number of the magnetic disks that form said rotor assembly and provides the motor speed control apparatus. Accordingly, an optimum startup time and a high rotation accuracy is obtainable at low cost while consuming low power and downsizing.

7 Claims, 4 Drawing Sheets

MOTOR SPEED CONTROL APPARATUS AND MOTOR SPEED CONTROL METHOD

BACKGROUND OF THE INVENTION

1. Field of the Invention

This invention relates in general to a motor speed control apparatus and method for a hard disk drive, and more particularly, to a motor speed control apparatus and method that can identify the type of rotor assembly installed in a hard disk drive.

2. Description of Related Art

A hard disk drive (HDD) has a magnetic disk contained in an enclosure, and said magnetic disk is rotationally driven by a spindle motor. In the enclosure, the positioning of a magnetic head is controlled on the disk by an actuator, and read/write operations for magnetic information are performed.

Here, the spindle motor performs feedback control of the speed. To be more specific, as shown in FIG. 4, the period of the spindle motor 102 is calculated as pulses by the MPU 103, the period, $T_n$, is compared to a target value, $T_{arget}$, a proportional operation and an integral operation are performed for difference $E_n$, predetermined output value $U_n$ is converted by digital/analog conversion (DAC), pulse width modulation (PWM) and the like on the basis of feedback coefficients $K_1$ associated with the proportional operation and $K_2$ associated with the integral operation, and $U_n$ is output to a driver 106 that supplies an electric current to the spindle motor 102. In addition, the code 108 in FIG. 4 is a period preceding the current period and the following relationships can be obtained:

$$E_n = T_n - T_{arget}$$

$$I_{n+1} = I_n + E_n$$

$$U_n = K_1 E_n + K_2 I_n.$$

One or two magnetic disks 110 are selectively installed on the hub of the spindle motor 102, incidentally, and the hard disk drive system is provided as a single disk model or a dual disk model according to the number of magnetic disks 110.

Because a single disk and dual disks are different in terms of the moment of inertia, feedback coefficients suitable to a single disk are different from feedback coefficients suitable to dual disks.

For this reason, in the conventional means, a dummy disk is added to the actual magnetic disk to make the moment of inertia of the single disk model the same as the moment of inertia of the dual disk model so that common feedback coefficients can be used. Otherwise, another conventional means is used in which the medium value between the feedback coefficient is suitable to the single magnetic disk and another feedback coefficient suitable to the dual magnetic disks.

The hard disk drive, however, on the one hand, is not only required to have a high rotation accuracy but also, especially in the case of a small hard disk drive such as that used under conditions of frequent ON/OFF operation of a computer, to have a shorter startup time at the time of startup, and, in addition, it is desirable that these requirements be met under the conditions of low power consumption and downsizing. Adding a dummy disk is not preferable from the points of ensuring low power consumption and downsizing.

On the other hand, it is possible to prepare two electronic boards, one incorporating a control circuit for the motor speed control using feedback coefficients suitable to the single disk and the other incorporating a control circuit for the motor speed control using other feedback coefficients suitable to the dual disks, and to connect each of the electronic boards differing from each other for the single disk model and the dual disk model. However, preparing two different electronic boards causes a cost increase and board installation is also troublesome.

It can be seen then that there is a need for a motor speed control apparatus and a motor speed control method in a motor having selectively installed rotor assemblies with different moments of inertia that can identify the type of rotor assembly installed to the motor.

It can also be seen that there is a need for determining feedback coefficients suitable to the identified rotor assembly in an automatic manner at the time the motor is started up, and performing speed control using said feedback coefficients suitable to the motor, wherein an optimum startup time and high rotation accuracy can be easily obtained at low cost under the conditions of low power consumption and downsizing.

SUMMARY OF THE INVENTION

To overcome the limitations in the prior art described above, and to overcome other limitations that will become apparent upon reading and understanding the present specification, the present invention discloses a motor speed control apparatus and method for a hard disk drive.

The present invention solves the above-described problems by providing a motor speed control apparatus and method for a hard disk drive.

In order to solve the above-mentioned problems, a motor speed control apparatus of the present invention is included in a motor that can have selectively installed rotor assemblies having different moments of inertia. The motor drives one of the rotor assemblies rotationally, while the motor speed control apparatus performs feedback control of the motor speed.

The present invention comprises a controller for performing speed feedback control of a motor using selected feedback coefficients. The motor has selectively installed rotor assemblies of different moments of inertia. Thus, the controller provides different feedback coefficients suitable to each type of rotor assemblies even though they may have moments of inertia different from one another. An application means for applying a voltage to drive said motor and a detector detects the period of rotation and the period of subsequent rotation at the time said motor is started up. An identification means identifies the type of rotor assembly installed on the motor from said detected period, the time constant of said motor being a function of the moment of inertia of the rotor assembly installed on the motor. The moment of inertia is obtained from the period of rotation and the period of subsequent rotation at the time said motor is started up. A selector determines the appropriate feedback coefficients for the identified rotor assembly.

An aspect of the present invention is that the rotor assembly varies its moment of inertia according to the number of the magnetic disks that form said rotor assembly and provides the motor speed control apparatus.

Another aspect of the present invention is that an optimum startup time and a high rotation accuracy may be easily obtained at low cost under the conditions of low power consumption and downsizing.

Another aspect of the present invention is that because the time constant $T_m$ is a function of the moment of inertia of the magnetic disks installed on the motor and time constant $T_m$ can be obtained referring to period $t_1$ of rotation and period $t_2$ of subsequent rotation at the time the motor is started up, the identification of whether the number of magnetic disks installed on the spindle motor is single or dual may be performed by comparing $T_m$.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a disk drive system that can identify the installed rotary assembly based on its inertia and will control the rotational speed of the rotary assembly in response to the identification of the type of rotary assembly installed.

Figure 1:
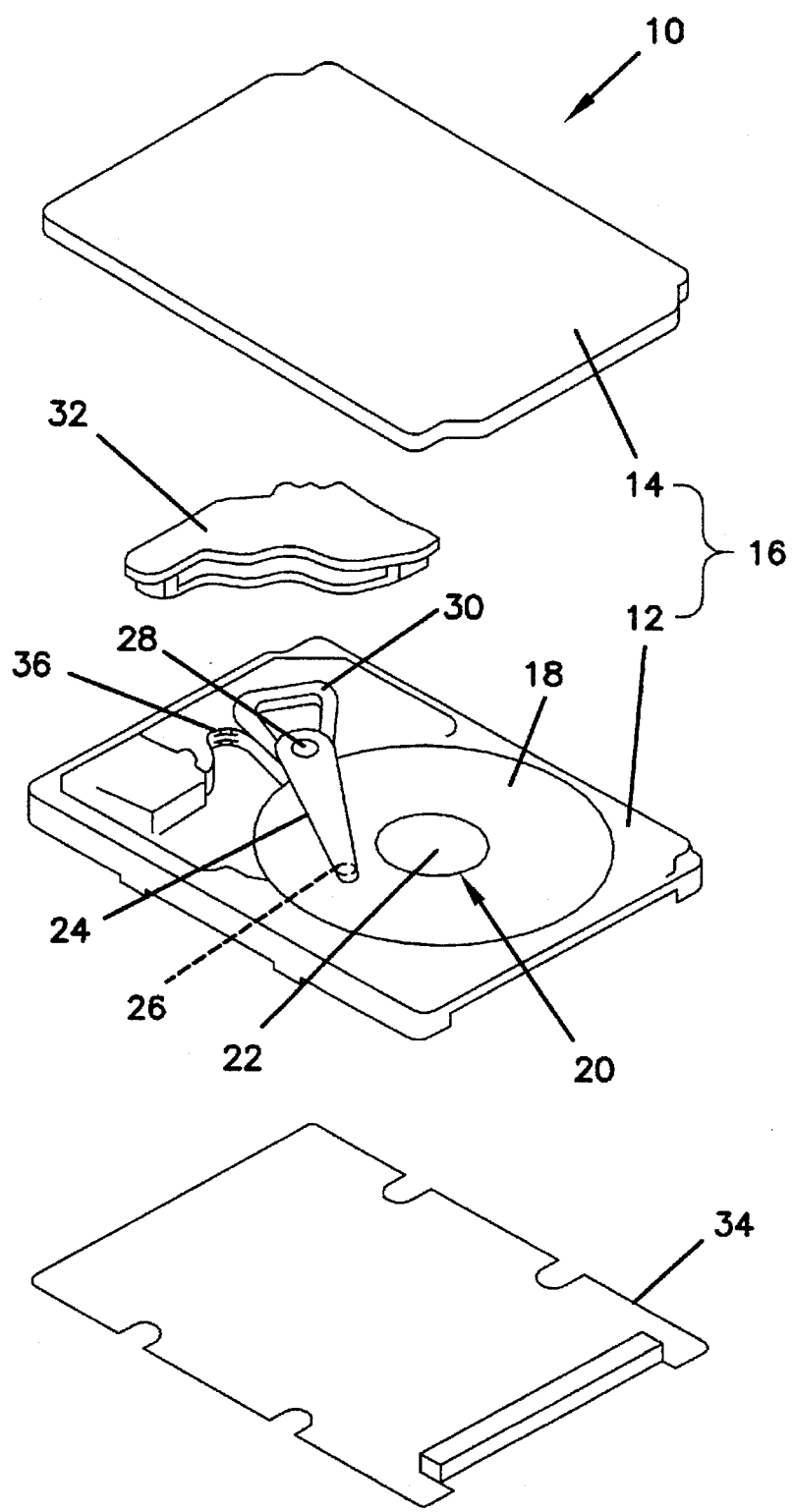
FIG. 1 is a partially exploded perspective view showing a hard disk drive employing this embodiment.

As shown in FIG. 1, a hard disk drive 10 as a magnetic disk apparatus has an enclosure case 16 comprising a shallow base 12 and a cover 14 that covers the open top of said shallow base. The enclosure case 16 has a rectangular thin box-like shape and is placed horizontally in a computer. A magnetic disk 18 is contained inside the enclosure case 16 as a rotor assembly. The magnetic disk 18 is installed on the hub 22 of the spindle motor 20, said spindle motor having a hub-in structure placed so as to protrude from the base 12, and said magnetic disk is rotationally driven by said spindle motor 20. The hub 22 is designed to be able to have selectively installed single and dual magnetic disks 18 on a common axis thereof, and the hard disk drive system 10 is regarded as a single disk model or a dual disk model according to the number of magnetic disks 18.

A head arm 24 that has a magnetic head 26 on one edge is placed inside of the enclosure case 16. The center portion of the head arm 24 is supported with the base 12 through a pivot 28 so as to rotate freely. At the other end of the head arm 24, a VCM coil 30 is provided and the actuator using voice coil motor (VCM) 32 contacting with the coil 30 enables the headarm 24 to rotate so that the magnetic head 26 can read, write, and delete magnetic information because it is position-controlled in the radial direction of the magnetic disk 18.

In addition, a card 34, which is actually a circuit board, can be attached to the outside (bottom) of the base. The power and signals such as read signals for the magnetic head 26 and the power for the coil 30 are transferred between the card 34 and the above-described head arm 24. The power and signals for the spindle motor 20 are transferred between the card 34 and the above-described spindle motor 20. The head arm 24 is connected to the card 34 at the bottom of the base 12 through the flexible cable 36, and the spindle motor 20 is connected to the card 34 also at the bottom of base 12.

A control circuit to perform feedback control for the speed for the spindle motor 20 is to be built in on the card 34. The circuit, having feedback coefficients suitable to single magnetic disks 18 and feedback coefficients suitable to dual magnetic disks 18, is designed to perform feedback control using selected feedback coefficients. The feedback control with each feedback coefficient is performed, for example, with the proportional operation and integral operation shown in FIG. 4. Feedback coefficient $K_1$ associated with the proportional operation and feedback coefficient $K_2$ associated with the integral operation vary their values according to the number of magnetic disks, whether a single magnetic disk or dual magnetic disks.

Now, when the spindle motor 20 is driven by applying a voltage without the above-described control, the time constant of the motor is a function of the moment of inertia of the magnetic disk 18 installed on the hub 22 of the spindle motor 20 and said time constant can be obtained referring to the period of rotation and the period of subsequent rotation at the time said motor is started up.

The dynamic expression about the magnetic disk 18 when the motor voltage is constant may be expressed as found in expression (1) below:

$$J \ddot{\theta} = K_e(V - K_e \dot{\theta})/R \qquad (1)$$

where $\theta$: Rotation angle,

J: Moment of inertia, $K_e$: Torque constant/counter electromotive force,

V: Voltage, and

R: Motor resistance.

If a speed at a given time is defined as $\omega_0$, time measurement is started from that time and, if the time required (period) in a rotation is defined as $t_1$, the following expression (2) can be deduced from the expression (1) because one round is $2\pi$:

$$2\pi = Bt_1 + T_m(B - \omega_0)(e^{-t_1/T_m} - 1) \qquad (2)$$

where

B: $V/K_e$, and $T_m$: $JR/K_e^2$ (motor time constant).

Speed $\omega_1$ at the time when period $t_1$ has passed can be obtained in the expression (3):

$$\omega_1 = B - (B - \omega_0)e^{-t_1/T_m}. \qquad (3)$$

If the period of subsequent rotation is $t_2$, then following expression (4) is effective:

$$2\pi = Bt_2 + T_m(B-\omega_1)(e^{-t2/Tm}-1) \qquad (4)$$
$$= Bt_2 + T_m(B-\omega_0)e^{-t1/Tm}(e^{-t2/Tm}-1).$$

As the speed becomes faster to a certain extent, $t_1, t_2 \ll T_m$ becomes effective, and $e^x \approx 1+x$ is used to change expressions (2) and (4), then expression (5) can be obtained:

$$2\pi = \omega_0 t_1 = Bt_2 - (B-\omega_0)(T_m-t_1)t_2/T_m. \qquad (5)$$

Then, for obtaining $T_m$ by deleting $\omega_0$, expression (6) can be obtained:

$$T_m = (Bt_2 - 2\pi t_1 t_2)/(t_1 - t_2 2\pi). \qquad (6)$$

Figure 3:
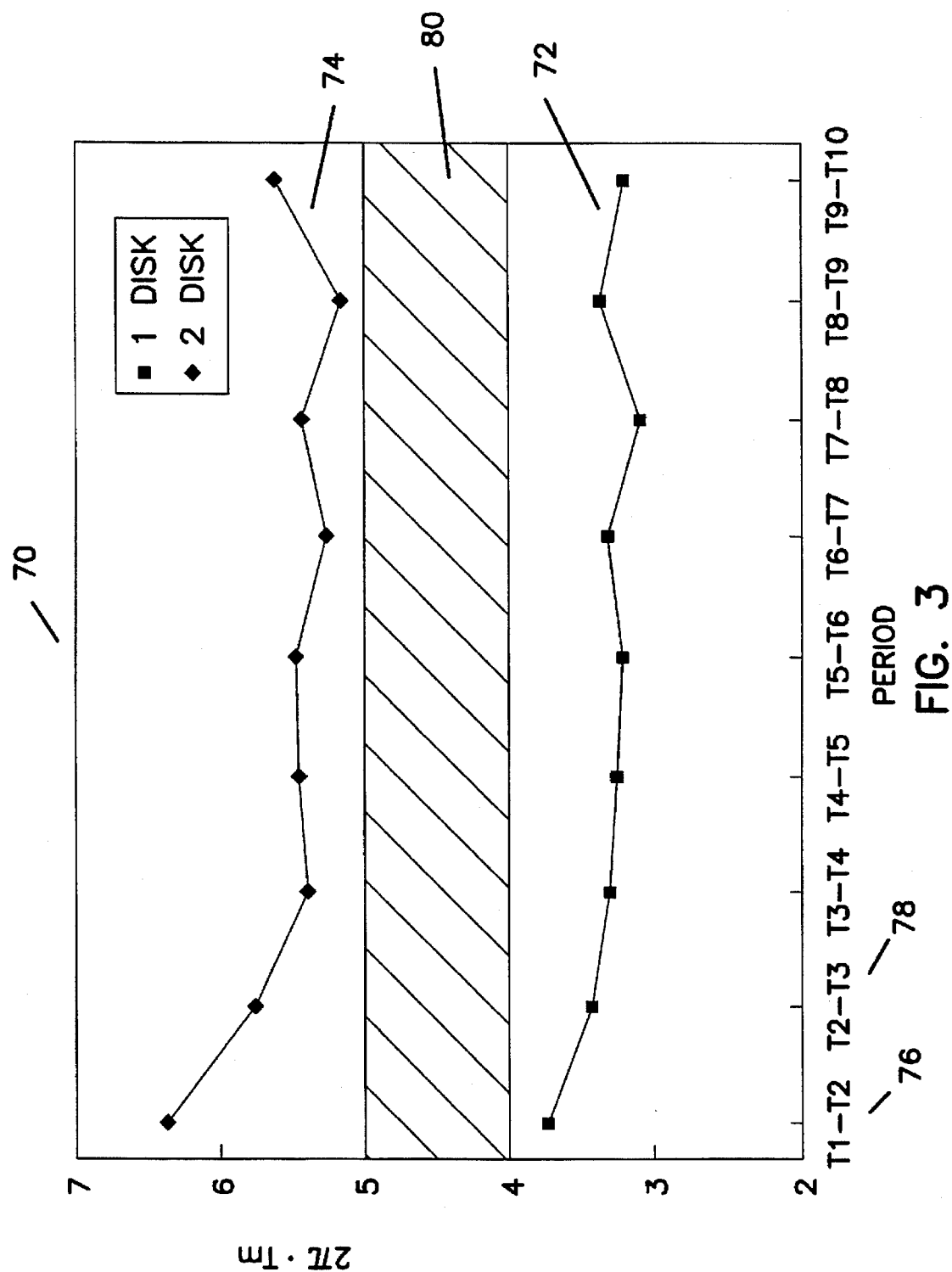
FIG. 3 is a graph showing the motor time constant obtained from the period of rotation and the period of subsequent rotation at the time the motor is started up.

FIG. 3 illustrates a graph 70 for the values $2\pi \cdot T_m$ (time constant $T_m$ multiplied by $2\pi$ for convenience sake) for a single magnetic disk 72 and for dual magnetic disks 74 respectively obtained in each individual period at the time the motor is started up by applying a regular voltage to the spindle motor 20. In FIG. 3, T1–T2 76 means that it is referring to first period T1 and subsequent period T2, and T2–T3 78 is referring to second period T2 and subsequent period T3, and so on, and, hereafter, successive periods are shown in sequence as startup. The values of $2\pi \cdot T_m$ for dual magnetic disks 74 are greater than $2\pi \cdot T_m$ for the single magnetic disk 72 through all periods during motor startup.

Therefore, after predetermining a medium value between $2\pi \cdot T_m$ for dual disks 74 and $2\pi \cdot T_m$ for the single disk 72, further detecting the period of rotation and the period of subsequent rotation to obtain the value $2\pi \cdot T_m$, if thus obtained $2\pi \cdot T_m$ value turns out to be greater than the predetermined value (assume it is $T_{ms}$), it is recognized that the number of the magnetic disks is two and, if smaller than the predetermined value $T_{ms}$, it is then recognized that the number of the magnetic disks is one. Predetermined value $T_{ms}$ can be, for example referring to FIG. 3, set within the shaded area 80.

Figure 2:
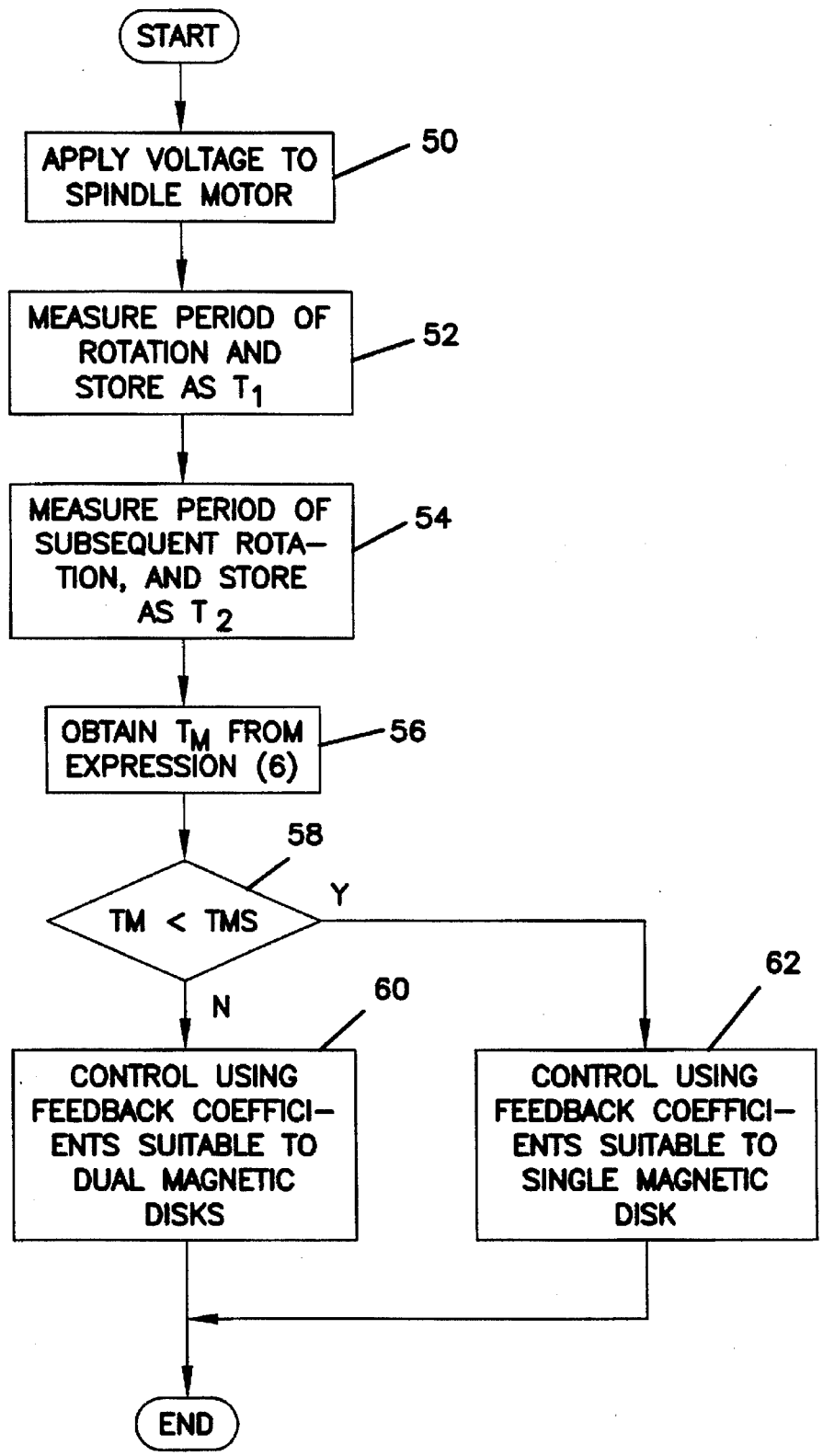
FIG. 2 is a flowchart according to a motor speed control apparatus and a motor control method of an embodiment of the present invention.

Referring to the above-described statements, explanation will now be provided according to FIG. 2 about the performance of speed control for the spindle motor 20 using feedback coefficients suitable to a single magnetic disk 18 and dual magnetic disks 18, respectively.

First of all, in step 50, a voltage to the spindle is applied to the spindle motor 20. Then, the spindle motor 50 is started to rotate.

In step 52, the period of rotation is measured as the motor is started up, and it is stored as $t_1$.

In step 54, the period of subsequent rotation of the rotation whose period was measured in step 52 is measured and it is stored as t2.

In step 56, value $T_m$ is obtained using expression (6) based on periods $t_1$ and $t_2$.

In step 58, step 60 is performed if time constant $T_m$ is greater than predetermined $T_{ms}$, or step 62 is performed if time constant $T_m$ is smaller than predetermined $T_{ms}$.

Figure 4:
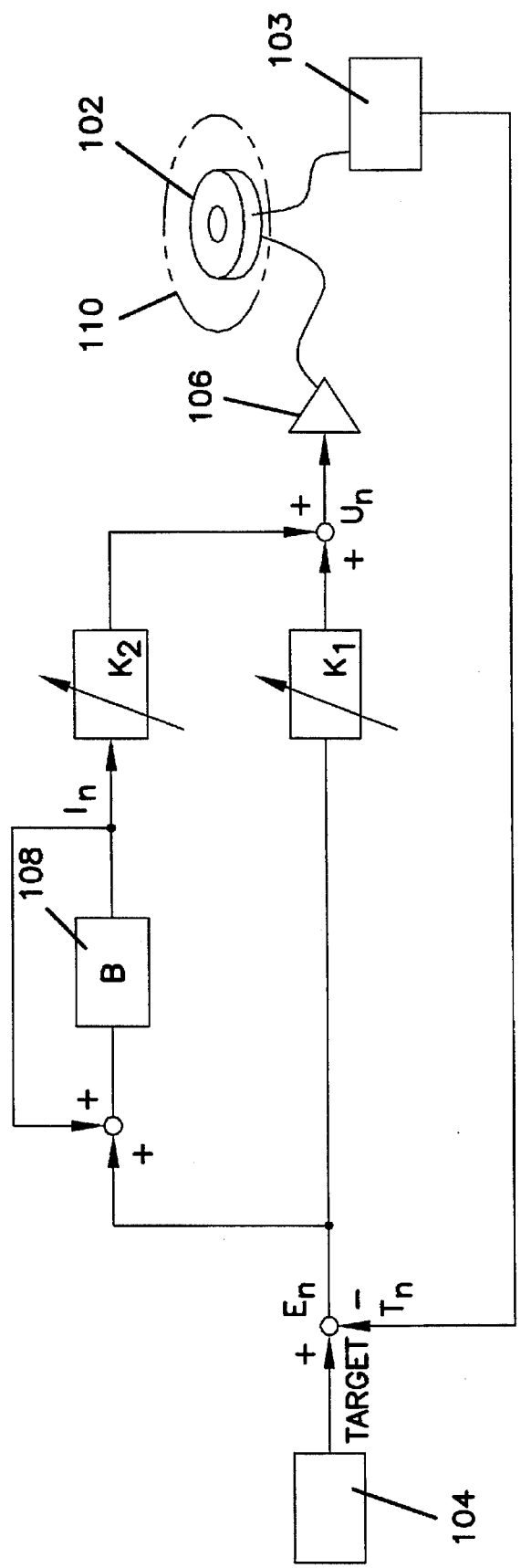
FIG. 4 is a block diagram showing feedback control.

In step 60, assigning feedback coefficients suitable to the dual disks to $K_1$ and $K_2$ in FIG. 4, the speed control of the spindle motor 20 is performed. In step 62, assigning the feedback coefficients suitable to the single disk to $K_1$ and $K_2$ in FIG. 4, the speed control of the spindle motor 20 is performed.

In addition, for detected periods $t_1$ and $t_2$, insofar as the number of magnetic disks can be identified, that is, whether it is single or dual by comparing time constant $T_m$ obtained from $t_1$ and $t_2$ with predetermined $T_{ms}$, $t_1$ and $t_2$ can be ones for any rotation and the subsequent rotation at the time the motor is started up.

When above-described structures are used, based on the fact that motor time constant $T_m$ is a function of the moment of inertia of the magnetic disk 18 installed on the hub 22 of the spindle motor 20 and motor time constant $T_m$ can be obtained referring to the periods of rotation and the period of subsequent rotation at the time the motor is started up, it is possible to identify whether the number of magnetic disks 18 installed on the hub 22 of the spindle motor is single or dual, with the period of rotation and the period of subsequent rotation, both of which are detected at the time the motor is started up.

Based on this identification, the feedback coefficients suitable to the given number of magnetic disks 18 is selected and feedback control for the spindle motor 20 can be started using said feedback coefficients.

Consequently, for the hard disk drive 10 that is required to provide low power consumption and downsizing, there is no need to prepare dummy magnetic disks or different circuit boards (cards). These thus result in reduced cost, a simplified installation process for the rotor assemblies, and the like. That the startup time can be reduced under conditions of low power consumption and downsizing is effective especially when ON/OFF switching is done frequently.

In this manner, identifying the number of magnetic disks 18 installed on the motor, that is, whether it is single or dual, in an automatic manner at the time of motor startup, a speed control using suitable feedback coefficients is conducted for the spindle motor 20, and a further optimum startup time and a high rotation accuracy can be obtained at low cost under the conditions of low power consumption and downsizing.

In addition, in the above embodiment, the explanation of the case in which the spindle motor 20 is selectively installed with single or dual magnetic disks 18 does not limit the present invention to this. For example, the case in which the motor can be selectively installed with dual or triple magnetic disks is also possible insofar as their time constants are different. Speaking of three or more magnetic disks, the case in which the motor can be selectively installed as single, dual, triple, and so forth is also possible. In this case, it is only necessary to predetermine three or more feedback coefficients and two or more said setting values $T_{ms}$ to be compared with motor time constant $T_m$. The same principle can be applied to the other rotor assemblies rather than the magnetic disks.

Furthermore, in the above embodiment, the explanation made of the hard disk drive system does not limit the present invention to this, and there can be other various applications. For example, the rotor assembly need not be confined to the magnetic disk. In the above embodiment, the explanation made of the case in which the moment of inertia for each magnetic disk is the same but the moments of inertia of the rotor assemblies comprising different numbers of magnetic disks are accordingly different does not limit the present invention to this, and the case in which the rotor assembly comprises the same number of rotors each of which has different shapes or different weights, and therefore the rotor assembly results in having different moments of inertia according to the configuration of the exchanged rotors is also possible.

Furthermore, the motor to be used need not be a spindle motor, but can be other types of motors. Still furthermore, in the above embodiment, the explanation of the feedback control associated with the proportional operation and integral operation does not limit the present invention to this, and there can be other various feedback controls applied.

In summary, according to the above-described structure, detecting the period of rotation and the period of subsequent rotation can be achieved at the time a motor is started up through applying a voltage and being driven.

A rotor assembly installed on the motor is identified from said detected period of rotation and the period of subsequent rotation at the time said motor is started up because the time constant of said motor is a function of the moment of inertia of the rotor assembly installed on the motor and can be obtained from the period of rotation and the period of subsequent rotation at the time said motor is started up. Feedback coefficients suitable to the rotor assembly can be selected upon identifying the rotor assembly, and the feedback control for the motor can be started using feedback coefficients. Rotors having different moments of inertia and rotors with different numbers of rotors installed on the motor may be listed.

In a magnetic disk apparatus required to provide low power consumption and downsizing, the present invention is effective because there is no need to prepare dummy magnetic disks or different circuit boards, resulting in reduced cost, a simplified installation process for the rotor assemblies, and the like. That the startup time can be reduced under states of low power consumption and downsizing is of help, especially when ON/OFF switching is done frequently.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A motor speed control apparatus comprising:

a control means for performing feedback control of a speed of a motor using selected feedback coefficients, the motor having selectively installed rotor assemblies of different moments of inertia, the control means providing different feedback coefficients suitable to each of the rotor assemblies having moments of inertia different from one another;

an application means for applying a voltage to drive said motor;

a detection means for detecting a period of rotation and a period of subsequent rotation at the time said motor is started up;

an identification means for identifying a rotor assembly installed on the motor from said detected periods, the time constant of said motor being a function of the moment of inertia of the rotor assembly installed on the motor, the moment of inertia being obtained from the period of rotation and the period of subsequent rotation at the time said motor is started up; and a selection means for selecting feedback coefficients suitable to the identified rotor assembly.

2. The apparatus of claim 1, wherein said rotor assembly varies its moment of inertia according to the number of rotors which form said rotor assembly.

3. The apparatus of claim 2, wherein said rotor assembly is a magnetic disk for a magnetic disk apparatus.

4. A motor speed control method that performs feedback control of the motor speed in the motor that can have selectively installed rotor assemblies having different moments of inertia and drives to rotate one of the rotor assemblies, said motor speed control method, comprising the steps of:

predetermining the feedback coefficients respectively suitable to the rotor assemblies having different moments of inertia to perform feedback control of the motor speed;

applying a voltage to drive said motor;

detecting a period of rotation and a period of subsequent rotation at the time said motor is started up;

identifying a rotor assembly installed on the motor from said detected periods a time constant of said motor being a function of the moment of inertia of the rotor assembly installed on the motor, the time constant being obtained from the period of rotation and the period of subsequent rotation at the time said motor is started up;

selecting feedback coefficients suitable to the identified rotor assembly; and starting to perform feedback control using the selected feedback coefficients.

5. The method of claim 4, wherein said rotor assembly varies its moment of inertia according to the number of rotors which form said rotor assembly.

6. The method of claim 5, wherein said rotor assembly is a magnetic disk for a magnetic disk apparatus.

7. A disk drive apparatus, comprising:

a magnetic disk disposed within an enclosure;

a motor, coupled to the disk, for rotationally moving the disk;

an actuator, coupled to the enclosure, for moving a magnetic head relative to the disk; and a motor speed control apparatus comprising:

a control means for performing feedback control of a speed of a motor using selected feedback coefficients, the motor having selectively installed rotor assemblies of different moments of inertia, the control means providing different feedback coefficients suitable to each of the rotor assemblies having moments of inertia different from one another;

an application means for applying a voltage to drive said motor;

a detection means for detecting a period of rotation and a period of subsequent rotation at the time said motor is started up;

an identification means for identifying a rotor assembly installed on the motor from said detected periods, the time constant of said motor being a function of the moment of inertia of the rotor assembly installed on the motor, the moment of inertia being obtained from the period of rotation and the period of subsequent rotation at the time said motor is started up; and a selection means for selecting feedback coefficients suitable to the identified rotor assembly.

* * * * *